US008442290B2

(12) United States Patent
Johnson et al.

(10) Patent No.: US 8,442,290 B2
(45) Date of Patent: May 14, 2013

(54) SIMULTANEOUS DUAL WINDOW/LEVEL SETTINGS FOR DISPLAY OF CT COLONOGRAPHY IMAGES

(75) Inventors: C. Daniel Johnson, Scottsdale, AZ (US); Michael J. Carston, Rochester, MN (US); Armando Manduca, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 533 days.

(21) Appl. No.: 12/523,465

(22) PCT Filed: Jan. 22, 2008

(86) PCT No.: PCT/US2008/051699
§ 371 (c)(1),
(2), (4) Date: Jan. 5, 2010

(87) PCT Pub. No.: WO2008/089489
PCT Pub. Date: Jul. 24, 2008

(65) Prior Publication Data
US 2012/0008841 A1 Jan. 12, 2012

Related U.S. Application Data

(60) Provisional application No. 60/881,231, filed on Jan. 19, 2007.

(51) Int. Cl.
*G06K 9/00* (2006.01)
(52) U.S. Cl.
USPC .......................................................... 382/131

(58) Field of Classification Search .......... 382/128–134; 128/920–925; 356/39–49; 600/407–414, 600/424–426; 345/581–618
See application file for complete search history.

(56) References Cited

U.S. PATENT DOCUMENTS

| 5,891,030 A | 4/1999 | Johnson et al. |
| 5,913,820 A | 6/1999 | Bladen et al. |

(Continued)

FOREIGN PATENT DOCUMENTS

| WO | WO 2007/030132 | 3/2007 |
| WO | WO 2008/089483 A3 | 7/2008 |

(Continued)

OTHER PUBLICATIONS

Carston, Michael J. et al., "CT Colonography of the Unprepared Colon: An Evaluation of Electronic Stool Subtraction", SPIE Medical Imaging, vol. 5746, pp. 424-431, 2005.

(Continued)

*Primary Examiner* — Atiba O Fitzpatrick
(74) *Attorney, Agent, or Firm* — Faegre Baker Daniels LLP

(57) ABSTRACT

A method for processing and displaying colonography image data. First distance tissue pixels representative of tissue within a first distance of gas pixels representative of gas are processed with a first window/level setting to generate a first setting set of image pixels. Second distance tissue pixels representative of tissue within a second distance of the gas pixels are processed with a second window/level setting to generate a second setting set of image pixels. The second distance is a distance greater than the first distance. A colonography image including both the first and second setting sets of image pixels is then displayed.

19 Claims, 1 Drawing Sheet

U.S. PATENT DOCUMENTS

| | | | |
|---|---|---|---|
| 6,374,134 | B1 | 4/2002 | Bladen et al. |
| 6,516,212 | B1 | 2/2003 | Bladen et al. |
| 6,522,907 | B1 | 2/2003 | Bladen et al. |
| 6,757,557 | B1 | 6/2004 | Bladen et al. |
| 6,785,410 | B2 | 8/2004 | Vining et al. |
| 6,909,913 | B2 | 6/2005 | Vining |
| 6,928,314 | B1 | 8/2005 | Johnson et al. |
| 6,947,784 | B2 | 9/2005 | Zalis |
| 7,035,681 | B2 | 4/2006 | Johnson et al. |
| 7,149,564 | B2 | 12/2006 | Vining et al. |
| 7,174,202 | B2 | 2/2007 | Bladen et al. |
| 2006/0018549 | A1 | 1/2006 | Liang et al. |
| 2006/0047227 | A1 | 3/2006 | Jerebko |
| 2006/0270928 | A1 | 11/2006 | Geiger et al. |
| 2007/0003131 | A1 | 1/2007 | Kaufman |
| 2007/0127790 | A1* | 6/2007 | Lau et al. ............ 382/128 |
| 2007/0167722 | A1 | 7/2007 | Bladen et al. |

FOREIGN PATENT DOCUMENTS

| | | |
|---|---|---|
| WO | WO 2008/089489 A2 | 7/2008 |
| WO | WO 2008/089490 A2 | 7/2008 |
| WO | WO 2008/089492 A2 | 7/2008 |

OTHER PUBLICATIONS

Cotton, Peter B. et al., "Computed Tomographic Colonography (Virtual Colonoscopy): A Multicenter Comparison With Standard Colonoscopy for Detection of Colorectal Neoplasia", JAMA, Apr. 14, 2004, vol. 291, No. 14, pp. 1713-1719.

Gatto, Nicolle M. et al., "Risk of Perforation After Colonoscopy and Sigmoidoscopy: A Population-Based Study", Journal of the national Cancer institute, vol. 95, No. 3, Feb. 5, 2003, pp. 230-236.

Iannaccone, Riccardo et al., "Computed Tomographic Colonography Without Cathartic Preparation for the Detection of Colorectal Polyps", Gastroenterology, vol. 127, pp. 1300-1311, 2004.

International Search Report and Written Opinion for PCT/US2008/051676, mailed Aug. 1, 2008, 10 pages.

International Search Report and Written Opinion for PCT/US2008/051699, mailed Jul. 11, 2008, 10 pages.

International Search Report and Written Opinion for PCT/US2008/051703, mailed Jul. 14, 2008, 9 pages.

International Search Report and Written Opinion for PCT/US2008/051710, mailed Jul. 30, 2008, 12 pages.

Jemal, Ahmedin et al., "Cancer Statistics 2003", CA Cancer J Clin 2003; 53:5-26.

Johnson, C. Daniel et al., "Prospective Blinded Evaluation of Computed Tomographic Colonography for Screen Detection of Colorectal Polyps", Gastroenterology 2003; 125:311-319.

Lakare, Sarang et al., "Electronic Colon Cleansing Using Segmentation Rays for Virtual Colonoscopy", SPIE Medical Imaging, vol. 4683 pp. 412-418, 2002.

Lakare, Sarang et al., "Robust Colon Residue Detection Using Vector Quantization Based Classification for Virtual Colonoscopy", SPIE Medical Imaging, vol. 5031, pp. 515-520, 2003.

Lieberman, David A. et al., "Use of Colonoscopy to Screen Asymptomatic Adults for Colorectal Cancer", The New England Journal of Medicine, vol. 343, Jul. 20, 2000, No. 3, pp. 162-169.

Pickhardt, Perry J. et al., "Computed Tomographic Virtual Colonoscopy to Screen for Colorectal Neoplasia in Asymptomatic Adults", The New England Journal of medicine, Dec. 4, 2003, vol. 349, No. 23, pp. 2191-2200.

Ristvedt, Stephen L. et al., "Patient Preferences for CT Colonography, Conventional Colonoscopy, and Bowel Preparation", The American Journal of Gastroenterology, vol. 98, No. 3, 2003, pp. 579-585.

Seeff, Laura C. et al., "Are We Doing Enough to Screen for Colorectal Cancer? Findings From the 1999 Behavioral Risk Factor Surveillance System", The Journal of Family Practice, vol. 51, No. 9, Sep. 2002, pp. 761-766.

Serlie, Iwo et al., "A Probabilistic Method for Virtual Colonoscopy Cleansing", SPIE Medical Imaging, vol. 5031, pp. 405-412, 2003.

Serlie, Iwo et al., "Computed Cleansing for Virtual Colonoscopy Using a Three-Material Transition Model", R.E. Ellis and T.M. Peters (Eds.): MICCAI 2003, LNCS 8979, pp. 175-183, 2003, © Springer-Verlag Berlin Heidelberg 2003.

Weitzman, Elissa R. et al., "Risk and Reluctance: Understanding Impediments to Colorectal Cancer Screening", Preventive Medicine 32, 502-513 (2001.

Winawer, Sidney J. et al., "Prevention of Colorectal Cancer by Colonoscopic Polypectomy", The New England Journal of Medicine, vol. 329, No. 27, Dec. 30, 1993, pp. 1978-1981.

Zalis, Michael E. et al., "Digital Subtraction Bowel Cleansing for CT Colonography using Morphological and Linear Filtration Methods", IEEE Transactions on Medical Imaging. vol. 23, pp. 1335-1343, 2004.

\* cited by examiner

SIMULTANEOUS DUAL WINDOW/LEVEL SETTINGS FOR DISPLAY OF CT COLONOGRAPHY IMAGES

REFERENCE TO RELATED APPLICATION

This application claims the benefit of U.S. provisional application Ser. No. 60/881,231, filed on Jan. 19, 2007 and entitled Simultaneous Dual Window/Level Settings For Display Of CT Colonography Images, which is incorporated herein in its entirety by reference.

GOVERNMENT LICENSE RIGHTS

This invention was made with government support under Government Contract No. CA075333 awarded by the National Cancer Institute. The government has certain rights in the invention.

TECHNICAL FIELD

The invention relates generally to methods and systems for processing and displaying images of a patient's body for diagnostic purposes. In particular, the invention is a method for processing and displaying images of a patient's colon.

BACKGROUND

Colonography, the use of electronic imaging technologies such as computed tomography (CT) to generate images of a patient's colon for purposes of colorectal cancer screening, is generally known. By way of example, these technologies are disclosed in the Johnson et al. U.S. Pat. Nos. 6,928,314 and 7,035,681, the Zalis U.S. Pat. No. 6,947,784, the Vining U.S. Pat. Nos. 6,909,913 and 7,149,564, and PCT publication no. WO 2007/030132, all of which are incorporated herein by reference. Briefly, this methodology involves obtaining a series of CT images of adjacent portions or slices of the colon. A radiologist then studies each of the images to identify any pre-cancerous polyps. Alternatively, a computer can effectively create a simulated intraluminal flight through the colon (this is also known as virtual colonoscopy). Colonography has been demonstrated to be a highly efficacious approach for detecting colorectal polyps.

When viewing CT images on a computer screen, the images typically have an intrinsic "dynamic range" of 4096 distinct gray levels (that is, one of 4096 different intensity values can be recorded at every pixel). However, a conventional computer monitor can typically only display 256 distinct gray levels. There are thus many possible ways to convert the measured data for viewing. For example, one can display the 256 lowest gray levels, with everything above this being displayed as pure white; one could display the brightest 256 levels, with everything darker than this being displayed as pure black; or one could evenly apportion the 4096 possible levels among the 256 available levels by dividing by 16, giving the most faithful overall rendition but losing much of the possible discriminating ability present in the data. In practice, different such mappings (known as window/level settings) are used for different purposes. For example, for optimal viewing of the lung, which is very dark, discrimination in bright parts of the image is of limited value. Thus, all bright pixels can be set to white and the available gray levels reserved for use in the appropriate brightness range. Radiologists have defined many such window/level settings that are known and in standard use to highlight different parts of the anatomy.

In a 2D axial review, radiologists often scan the colon data twice on a computer screen. The colon can first be viewed with a "lung" window/level setting that clearly shows protrusions into the lumen that are indicative of polyps. When such a protrusion is found, the reader may switch to a "tissue" window to determine if the object consists of soft tissue or fat. A second pass can be made in the reverse direction at the "tissue" window/level setting to look for areas of wall thickening that are indicative of flat lesions.

SUMMARY

The invention is an improved method and system for processing and displaying images of a patient's body structures that enhances diagnostic speed and accuracy. One embodiment of the invention includes identifying first intensity pixels within a first intensity value range, identifying first distance pixels within a second intensity value range different than the first intensity value range and within a first distance from a first intensity pixel, and identifying second distance pixels within the second intensity value range and greater that the first distance from a first intensity pixel. The first distance pixels are processed with a first window/level setting. The second distance pixels are processed with a second window/level setting that is different than the first window/level setting. In another embodiment of the invention, pixels between the first and second distances from a first intensity pixel are processed with transition window/level settings varying between the first and second window/level settings as a function of the distance between the first and second distances.

DESCRIPTION OF THE INVENTION

The simultaneous dual window/level display of the colon in accordance with the invention is a viewing technique that displays 2D or other images with first (e.g., lung) window/level settings in certain portions of the image, and second (e.g., tissue) window/level settings in the other portions. Specifically, pixels within a given distance (d1) of air are displayed using a lung window, while pixels farther than a given distance (d2) from air are displayed using a tissue window. A smooth transition can be generated for intermediate pixels using a linear blend of the lung and tissue window/level settings.

The dual window/level technique can allow the reader to view the data in a single pass, which can reduce reading time. The lung window/level portions of the image would allow the reader to easily locate objects that protrude into the colon, while the tissue window/level portions would allow the reader to find regions of wall thickening. Since the interior of any protrusions can be displayed at a tissue window/level, there also may not be a need to switch settings to determine if such an object consists of soft tissue or fat.

The values of d1 and d2 can be set appropriately. The value d1 should typically be large enough so that the protrusion can be seen in the image, yet small enough so that it does not mask the interior of the protrusion. Similarly, the value d2 can be sufficiently large to allow a smooth transition from the lung window, yet small enough so that the interior of the protrusion can be seen with the tissue window. Optimal d1 and d2 values can be determined empirically. These values may vary under different conditions, or can be adjustable by the individual user (e.g., through a GUI).

Figure 1:
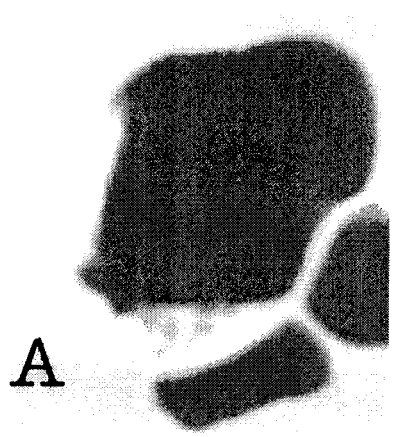
FIG. 1 is an image of a portion of a patient's colon where the image data was processed using conventional lung window/level settings.
Figure 2:
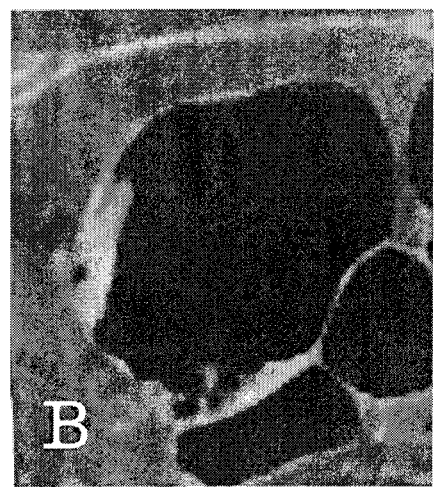
FIG. 2 is an image of the colon portion shown in FIG. 1 where the image data was processed using conventional soft tissue window/level settings.
Figure 3:
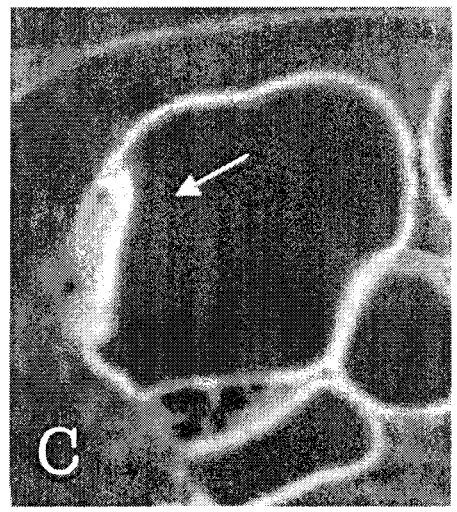
FIG. 3 is an image of the colon portion shown in FIG. 1 where the image data was processed using lung and soft tissue window/level settings in accordance with one embodiment of the invention.

As an example, FIG. 1 is an image of a colon slice displayed after the image data was processed using conventional lung window/level settings. FIG. 2 is an image of the same colon slice shown in FIG. 1, displayed after the image data was processed using conventional soft tissue window/level settings. FIG. 3 is an image of the same colon slice shown in FIG. 1, displayed after the image data was processed using lung and soft tissue window/level settings in accordance with the invention. Using images such as that shown in FIG. 3 enables clinicians to review only a single data set with marked interpretation time savings, while demonstrating the attenuation characteristics of stool and polyps adjacent to/arising from the colon wall. The flat polyp pointed to by the arrow in FIG. 3 is displayed well without distortion.

Although the invention has been described with reference to preferred embodiments, those skilled in the art will recognize that changes can be made in form and detail without departing from the spirit and scope of the invention.

What is claimed is:

1. A method for operating a computer to process a body image, including:
   identifying first intensity pixels in the body image that are within a first intensity value range;
   identifying first distance pixels in the body image that are within a second intensity value range different than the first intensity value range and within a first distance from one of the identified first intensity pixels;
   identifying second distance pixels in the body image that are within the second intensity value range and greater than the first distance from one of the identified first intensity pixels;
   processing the identified first distance pixels with a first window/level setting; and processing the identified second distance pixels with a second window/level setting that is different than the first window/level setting; and
   storing the processed first and second distance pixels for display in an image including both the processed first and second distance pixels.

2. The method of claim 1 wherein identifying the second distance pixels includes identifying second distance pixels that are greater than or equal to a second distance from a first intensity pixel, wherein the second distance is a distance greater than the first distance.

3. The method of claim 2 and further including processing pixels between the first and second distances from a first intensity pixel with transition window/level settings varying between the first and second window/level settings as a function of the distance between the first and second distances.

4. The method of claim 3 wherein processing the pixels with transition window/level settings includes processing the pixels as a linear function of the distance of the pixels between the first and second distances.

5. The method of claim 4 and further including simultaneously displaying as parts of an image the pixels processed with the first, second and transition window/level settings.

6. The method of claim 3 and further including simultaneously displaying as parts of an image the pixels processed with the first, second and transition window/level settings.

7. The method of claim 3 wherein:
   the method further includes receiving distance input information representative of an operator selected first distance and/or an operator selected second distance; and
   identifying the first and/or second distance pixels includes identifying the pixels as a function of the distance input information.

8. The method of claim 3 wherein:
   the method further includes receiving window/level input information representative of an operator selected first window/level setting and/or an operator selected second window/level setting; and
   processing the first and/or second distance pixels includes processing the pixels as a function of the window/level input information.

9. The method of claim 1 and further including simultaneously displaying as parts of an image the pixels processed with the first and second window/level settings.

10. The method of claim 1 for processing a human body image.

11. The method of claim 1 wherein:
    the method further includes receiving distance input information representative of an operator selected first distance and/or an operator selected second distance; and
    identifying the first and/or second distance pixels includes identifying the pixels as a function of the distance input information.

12. The method of claim 1 wherein:
    the method further includes receiving window/level input information representative of an operator selected first window/level setting and/or an operator selected second window/level setting; and
    processing the first and/or second distance pixels includes processing the pixels as a function of the window/level input information.

13. A method for processing and displaying a single colonography image, including:
    processing first distance tissue pixels in the image that are representative of tissue within a first distance of gas pixels representative of gas with a first window/level setting to generate a first setting set of image pixels;
    processing second distance tissue pixels in the image that are representative of tissue greater than or equal to a second distance from the gas pixels with a second window/level setting to generate a second setting set of image pixels, wherein the second distance is a distance greater than the first distance; and
    displaying a colonography image including both the first and second setting sets of image pixels.

14. The method of claim 13 wherein:
    the method further includes processing transition pixels between the first and second distances from the gas pixels with transition window/level settings varying between the first and second window/level settings as a function of the distance between the first and second distances to generate a transition setting set of image pixels; and
    displaying a colonography image includes displaying an image including the first, second and transition setting sets of image pixels.

15. The method of claim 14 wherein processing the transition pixels includes processing the pixels as a linear function of the distance of the pixels between the first and second distances.

16. The method of claim 14 wherein:
the method further includes receiving distance input information representative of an operator selected first distance and/or an operator selected second distance; and
processing the first and/or second distance pixels includes processing the pixels as a function of the distance input information.

17. The method of claim 16 wherein:
the method further includes receiving window/level input information representative of an operator selected first window/level setting and/or an operator selected second window/level setting; and
processing the first and/or second distance pixels includes processing the pixels as a function of the window/level input information.

18. The method of claim 13 wherein:
the method further includes receiving distance input information representative of an operator selected first distance and/or an operator selected second distance; and
processing the first and/or second distance pixels includes processing the pixels as a function of the distance input information.

19. The method of claim 13 wherein:
the method further includes receiving window/level input information representative of an operator selected first window/level setting and/or an operator selected second window/level setting; and
processing the first and/or second distance pixels includes processing the pixels as a function of the window/level input information.

* * * * *